(12) United States Patent
Nefzger et al.

(10) Patent No.: US 9,701,805 B2
(45) Date of Patent: Jul. 11, 2017

(54) POLYESTER POLYOLS WITH LONG-CHAIN POLYETHER POLYOL BUILDING BLOCKS AND USE THEREOF IN RIGID PUR/PIR FOAMS

(71) Applicant: BAYER MATERIALSCIENCE AG, Leverkusen (DE)

(72) Inventors: Hartmut Nefzger, Pulheim (DE); Uwe Kuenzel, Leverkusen (DE); Lutz Brassat, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/782,857

(22) PCT Filed: Apr. 8, 2014

(86) PCT No.: PCT/EP2014/056976
§ 371 (c)(1),
(2) Date: Oct. 7, 2015

(87) PCT Pub. No.: WO2014/166898
PCT Pub. Date: Oct. 16, 2014

(65) Prior Publication Data
US 2016/0039988 A1 Feb. 11, 2016

(30) Foreign Application Priority Data

Apr. 11, 2013 (EP) .................................... 13163407

(51) Int. Cl.
| | | |
|---|---|---|
| C08G 18/42 | (2006.01) | |
| C08G 63/672 | (2006.01) | |
| C08J 9/14 | (2006.01) | |
| C08G 18/76 | (2006.01) | |
| C08G 18/09 | (2006.01) | |
| C08G 18/40 | (2006.01) | |
| C08G 101/00 | (2006.01) | |

(52) U.S. Cl.
CPC ............ *C08J 9/141* (2013.01); *C08G 18/092* (2013.01); *C08G 18/4018* (2013.01); *C08G 18/4252* (2013.01); *C08G 18/7664* (2013.01); *C08G 63/672* (2013.01); *C08G 2101/0025* (2013.01); *C08G 2150/00* (2013.01); *C08J 2375/06* (2013.01)

(58) Field of Classification Search
CPC .......... C08G 63/672; C08G 18/4291–18/4294; C08G 18/4887; C08G 18/4252
See application file for complete search history.

(56) References Cited

U.S. PATENT DOCUMENTS

| | | | | |
|---|---|---|---|---|
| 4,605,729 A | * | 8/1986 | Barnes ............... | C08G 18/4244 528/272 |
| 6,855,844 B1 | * | 2/2005 | Geiger ................... | C08G 18/10 252/182.27 |
| 6,945,722 B2 | | 9/2005 | Colburn et al. | |
| 7,795,320 B2 | * | 9/2010 | Determan ............ | C08G 63/672 521/40 |
| 2002/0040122 A1 | | 4/2002 | Mirasol et al. | |
| 2007/0010593 A1 | | 1/2007 | Nefzger et al. | |
| 2011/0098418 A1 | * | 4/2011 | Morschhaeuser .... | C08G 63/672 525/437 |
| 2012/0123009 A1 | | 5/2012 | Nefzger et al. | |
| 2014/0234613 A1 | * | 8/2014 | Nefzger ............. | C08G 18/4895 428/319.1 |

FOREIGN PATENT DOCUMENTS

| | | | | |
|---|---|---|---|---|
| EP | 0340586 A1 | 11/1989 | | |
| EP | 1219653 A1 | 7/2002 | | |
| EP | 1632511 A1 | 3/2006 | | |
| WO | 9748747 A1 | 12/1997 | | |
| WO | 2004060950 A2 | 7/2004 | | |
| WO | WO 2011137011 A1 * | 11/2011 | ......... | C08G 18/4261 |
| WO | WO 2013024107 A1 * | 2/2013 | ......... | C08G 18/4895 |

* cited by examiner

*Primary Examiner* — Robert C Boyle
*Assistant Examiner* — Stephen Rieth
(74) *Attorney, Agent, or Firm* — Donald R. Palladino

(57) ABSTRACT

The invention relates to a polyester polyol which contains building units which are derived from ethylene glycol and/or diethylene glycol and which is characterized in that the polyester polyol furthermore comprises building units which are derived from at least one long-chain polyester polyol with a number-average molar mass of 1500 to 8000 Da. The invention further relates to a process for the production thereof and use thereof, in particular for the production of rigid PUR/PIR foams.

18 Claims, No Drawings

POLYESTER POLYOLS WITH LONG-CHAIN POLYETHER POLYOL BUILDING BLOCKS AND USE THEREOF IN RIGID PUR/PIR FOAMS

CROSS-REFERENCE TO RELATED APPLICATIONS

This application is a National Phase application of PCT/EP2014/056976, filed Apr. 8, 2014, which claims priority to European Application No. 13163407.3, filed Apr. 11, 2013, each of which being incorporated herein by reference.

FIELD

The invention relates to a polyester polyol comprising structural units derived from ethylene glycol and/or diethylene glycol and also to their use, in particular in the manufacture of rigid PUR/PIR foams.

BACKGROUND

Rigid PUR/PIR foams are these days overwhelmingly manufactured on the basis of aromatic polyester polyols, since these have a positive influence on the flame resistance of rigid PUR/PIR foams and their thermal conductivity. The raw materials used to prepare aromatic polyester polyols are chiefly phthalic acid/anhydride, terephthalic acid and isophthalic acid. Short-chain polyether polyols and also, in some instances, aliphatic polyester polyols are sometimes used in addition to and alongside aromatic polyester polyols in order to improve the solubility of pentanes for aromatic polyester polyols or to reduce the brittleness of the rigid isocyanurate-containing PUR/PIR foams.

EP 1219653 describes rigid PUR/PIR foams of improved flame resistance and low thermal conductivity which are based on aromatic polyester polyols. In addition, the use of aliphatic, cycloaliphatic or heterocyclic polyester polyols is also proposed.

WO 97/48747 teaches that rigid PUR/PIR foams of reduced brittleness and improved surface adherence are obtainable when the polyol component comprises aliphatic as well as aromatic polyester polyols.

WO 2004/060950 further discloses rigid PUR/PIR foams for spray foam applications with improved flame resistance and improved lambda aging characteristics that are based on aromatic polyester polyols. In addition, the use of aliphatic or heterocyclic polyester polyols is also proposed.

WO 2004/060950 teaches that rigid PUR/PIR foams of high thermal resistance and improved flame resistance are obtainable when the polyol component comprises preferably high-functionality aromatic polyester polyols.

U.S. Pat. No. 6,945,722 and US 2002/0040122 describe the use of Mannich polyols in the manufacture of purely water-blown systems because only the use of such polyols provides good flame resistance and dimensional stability. One immense disadvantage of such Mannich polyols is their high viscosity and the associated processability as spray foam system. The high viscosity tends to give rise to mixing problems and hence to foams having poor mechanical-physical properties.

There is increasing demand for rigid aliphatic polyester-based PUR/PIR foams in insulating panel manufacture. According to EP 1 632 511 A1, the polyester polyols may be constructed from technical-grade glutaric acid and also ethylene glycol. By way of added-substance materials there are mentioned further formulation constituents: a polyether polyol, a flame retardant such as TCPP as well as further auxiliary and added-substance materials.

Only comparatively inexpensive feedstocks come into consideration as conceivable synthons to replace and/or supplement the technical-grade glutaric acid because of the current market situation (high price pressure in the insulant market through "commoditized" insulants such as expanded polystyrene (EPS) and mineral wool), in particular phthalic anhydride. The use of phthalic anhydride in a polyester recipe consisting otherwise of technical-grade glutaric acid and ethylene glycol leads to araliphatic esters, but these are known not to be ideal for use in the manufacture of rigid foams.

It is desirable, then, in some instances to at least initially eschew the addition of the flame retardant TCPP or to admix a flame retardant at a later stage of formulation production. This is associated with additional formulation effort, while the compatibilizing effect of the flame retardant is initially forfeited.

SUMMARY

It is an object of the present invention to provide improved polyester polyols that overcome the prior art problems and are especially suitable for use in rigid PUR/PIR foam recipes. The rigid foams thus obtainable shall further have good fire protection properties.

We have found that this object is achieved by a polyester polyol comprising structural units derived from ethylene glycol and/or diethylene glycol, wherein the polyester polyol further comprises structural units derived from at least one long-chain polyether polyol having a number average molar mass of 1500 to 8000 Da.

DETAILED DESCRIPTION

It surprisingly transpires that "interesterification" of long-chain polyols into a polyester polyol comprising short-chain polyols in addition to the long-chain polyether polyols provides not only good fire protection properties but also, at the same time, monophasic components for providing rigid PUR/PIR foam systems and this even without the addition of compatibilizing flame retardants such as TCPP. In addition, compared with the previously used mixtures of a polyester, a long-chain polyether and TCPP, foams of comparable fire resistance are obtainable in this way by using less of the relatively costly long-chain polyether.

It further transpires that when the polyester polyols of the present invention, i.e., polyester polyols comprising a long-chain polyether polyol "interesterified" into the polymer chain, are used in PUR/PIR foams, foam defects on the foam underside are minimized. This gives foams having a good insulating effect.

Number average molar mass in the context of the present invention is determined via hydroxyl end group titration as per DIN 53240 (December 1971). The acid number is determined according to DIN EN ISO 2114 (June 2002). The experimentally determined hydroxyl number OHN in mg KOH/g is inserted into the commonly/generally known formula $M_{eq}=56100/OHN$ to determine the equivalent mass. This is in effect the number average equivalent mass which can be arithmetically converted into the number average molar mass (Me) by multiplication by the functionality (F), i.e., $M_n=F*M_{eq}$, or $M_n=56100*F/OHN$.

The functionality (F) in the context of this invention relates to the hydroxyl end groups. Acid end groups are not taken into account. F is defined as the number of OH end groups, divided by the number of molecules in an ensemble. F is normally apparent from the recipe for preparing the polyol, but may alternatively also be determined by $^1$H NMR.

F in the case of polyether polyols is thus obtained from the known functionality of the low molecular weight starter polyols. For example, the bifunctional starter polyol diethylene glycol leads to a bifunctional polyether polyol; trifunctional 1,1,1-trimethylolpropane leads to a trifunctional polyether polyol; a molar 1:1 mixture of diethylene glycol and 1,1,1-trimethylolpropane leads to a 2.5-functional polyether polyol; etc.

In the case of polyester polyols, first the recipe is tallied by computing the molar sum total of all the reactant molecules, e.g., dicarboxylic acids, anhydrides of dicarboxylic acids, diols, triols, etc. Similarly, the molar sum totals of all hydroxyl end groups and, separately, of all carboxyl end groups of all reactant molecules are computed by counting carboxylic anhydrides as having 2 end groups and lactones as having one hydroxyl end group and one carboxyl end group each.

The difference between (excess) hydroxyl groups and (deficient) carboxyl end groups (in the above sense) gives the number of hydroxyl end groups remaining in the final polyester polyol. Since the number of reactant molecules decreases by 1 with every esterification step (the water of reaction is exported), the number of polyester molecules remaining in the reaction vessel after all esterification steps, i.e., after complete conversion of the carboxyl groups (in the above sense) is:

(sum total of all reactant molecules)−(sum total of all carboxyl end groups of all reactant molecules)=(number of polyester molecules)

F is thus: F=(number of hydroxyl end groups in polyester polyol)/(number of polyester molecules)

Ring ester formation is not taken into account here for the purposes of the present invention.

Long-chain polyether polyols for the purposes of the present invention are polyether polyols having a number average molar mass of 1500 to 8000 Da. The term "long-chain" here serves to distinguish these polyether polyols from the shorter-chain polyols likewise used for the polyester polyol, viz., ethylene glycol and/or diethylene glycol. Preferred long-chain polyether polyols have a number average molar mass of 1500 to 8000 Da, preferably 1500 to 7000 Da, more preferably 2000 to 6000 Da, yet more preferably 2500 to 6000 Da, yet even more preferably 3500 to 6000 Da, most preferably 4000 to 6000 Da.

In one embodiment, the polyester polyol has hydroxyl numbers of 150 to 300 mg KOH/g, preferably of 160 to 260 mg KOH/g, more preferably of 165 to 260 mg KOH/g. The polyester polyol may further have an OH functionality of 1.8 to 3, preferably 1.9 to 2.5, more preferably 1.95 to 2.3.

In a further embodiment, the polyester polyol may have from 50 to 100 mol % of primary hydroxyl end groups.

Aside from the aforementioned structural elements, the polyester polyol of the present invention may in principle include any structural units known to a person skilled in the art for this class of substances. Preferably, the polyester polyol comprises structural units derived from an at least difunctional organic acid and selected in particular from glutaric acid, succinic acid, adipic acid, terephthalic acid, phthalic acid, isophthalic acid or combinations thereof, in particular glutaric acid, succinic acid, adipic acid, phthalic acid. The latter recitations are very preferably combined with ethylene glycol as (short-chain) polyol.

The polyester polyol of the present invention may be aliphatic or else araliphatic. Hence, in a further preferred embodiment, the aromatics fraction may be from 0 to 50 wt %, in particular 0 to <50 wt %, all based on the amount of ester obtained, where mixtures of glutaric acid, succinic acid, adipic acid and/or phthalic acid are used in particular as well as ethylene glycol. When there are aromatic groups; their proportion is >0 to 50 wt %. The aromatic fraction in the ester is computed from the ester recipe by dividing the amount of aromatic-containing compound used, i.e., for example phthalic anhydride and/or isophthalic anhydride, by the amount of ester obtained.

The proportions of long-chain polyether polyol, ethylene glycol and/or diethylene glycol and at least difunctional organic acid can be varied within wide limits. A polyester polyol of the present invention may more particularly be characterized in that the proportion of polyester polyol structural units derived from the long-chain polyether polyol is from 1 to 50 wt %, in particular from 2 to 30 wt %, preferably from 3 to 20 wt % and/or the proportion of polyester polyol structural units derived from ethylene glycol and/or diethylene glycol is from 10 to 70 wt %, in particular from 25 to 60 wt %, preferably from 40 to 58 wt %, more preferably from 35 to 58 wt %, and/or the proportion of polyester polyol structural units derived from the at least difunctional organic acid is from 30 to 80 wt %, in particular from 40 to 75 wt %, preferably from 50 to 70 wt %, wherein the wt % proportions are all based on the mass of the polyester polyol obtained.

The present invention further provides a method of preparing a polyester polyol of the present invention, which method comprises reacting an at least difunctional organic acid with ethylene glycol and/or diethylene glycol, preferably ethylene glycol, and at least one long-chain polyether polyol having a number average molar mass of 1500 to 8000 Da, if desired in the presence of at least one catalyst.

In one possible procedure for this, the reactants—a difunctional organic acid, ethylene glycol and/or diethylene glycol and the long-chain polyether polyol—are conjointly placed in the initial charge and reacted. It is similarly conceivable to first react the acid and only one of the alcohols, i.e., the short-chain polyol or the long-chain polyol, with each other and to only add whichever is the other polyol to the reaction mixture later, during the reaction.

Any catalyst known for the preparation of polyesters can be used in principle. This includes, for example, tin salts, e.g., tin dichloride, titanates, e.g., tetrabutyl titanate, or strong acids, e.g., p-toluenesulfonic acid. However, the polyesters can also be prepared without use of catalysts.

The polyesters are normally prepared without using a solvent. However, they can also be prepared with a solvent, in particular a water-entraining solvent (azeotropic esterification), such as benzene, toluene or dioxane for example. The exportation of the water of reaction in the solventless variant is normally augmented by applying a negative pressure, in particular at the end of the esterification. Pressures of 1 to 500 mbar are employed here. However, esterification is also possible at above 500 mbar. In this case, the exportation of the water of reaction can also be augmented by passing an inert gas, for example nitrogen or argon, through the reaction system.

The present invention further provides the method of using a polyester polyol of the present invention for a 1-phase polyol component of a two-component reaction system for producing rigid PUR/PIR foams, wherein the 1-phase polyol component is in particular free from flame retardants. As already noted above, one advantage of the polyester polyol according to the present invention is that it offers long-chain polyol building blocks and hence the advantages associated therewith without being reliant on the homogenizing properties of a flame retardant, in particular TCPP. It is accordingly possible to provide a 1-phase and therefore marketable polyol component where customers can themselves add their respective flame retardant of choice.

The invention further provides the method of using the polyester polyols of the present invention in the manufacture of rigid polyurethane foam products, for example polyurethane insulating panels, metal-faced elements, polyurethane slabstock foam, polyurethane spray foam, polyurethane in-situ foams or else in single- or multi-component assembly foam or as a raw material for adhesives.

The invention further provides a reaction system for producing rigid PUR/PIR foams, comprising the following components:
A) an organic polyisocyanate component,
B) a polyol component,
C) optionally auxiliary and added-substance materials and also blowing and co-blowing agent,
wherein said organic polyisocyanate component A) and said polyol component B) are used in such a mixing ratio relative to each other as to produce an index of 100 to 500, in particular 180 to 450, and the reaction system is characterized in that said polyol component B) comprises at least one polyester polyol of the present invention.

Index refers to the multiplication product with 100 of the molar ratio of all NCO groups of component A) to all NCO-reactive groups in the reaction system, i.e., components B) and C) in the present case.

The invention also provides the method of using the polyester polyols of the present invention as polyol component B) of a reaction system for producing rigid PUR/PIR foams.

Rigid PUR/PIR foams are rigid polyurethane foams comprising urethane structures with or without isocyanurate structures. Such a reaction system for rigid PUR/PIR foams is preferably suitable for use in the manufacture of rigid polyurethane foam products, for example polyurethane insulating panels, metal-faced composites, polyurethane slabstock foam, polyurethane spray foam, polyurethane in-situ foams or else in single- or multi-component assembly foam or as a raw material for adhesives.

The organic polyisocyanate component may in principle be selected from aliphatic, cycloaliphatic, araliphatic, aromatic and heterocyclic polyisocyanates, for example those described by W. Siefken in Justus Liebigs Annalen der Chemie 562, pp. 75-136, for example those of the formula

where n is 2-4, preferably 2-3, and Q is an aliphatic hydrocarbyl moiety of 2-18, preferably 6-10 carbon atoms, a cycloaliphatic hydrocarbyl moiety of 4-15, preferably 5-10 carbon atoms, an aromatic hydrocarbyl moiety of 6-15, preferably 6-13 carbon atoms or an araliphatic hydrocarbyl moiety of 8-15, preferably 8-13 carbon atoms, for example polyisocyanates as described in DE-A 2,832,253, pages 10-11.

Preference is generally given to polyisocyanates of this type which are readily available industrially, for example 2,4- and 2,6-tolylene diisocyanate (TDI) and also mixtures of these isomers. Polyphenyl polymethylene polyisocyanates, for example those obtained by aniline-formaldehyde condensation and subsequent treatment with phosgene (crude MDI), and polyisocyanates comprising carbodiimide, urethane, allophanate, isocyanurate, urea or biuret groups (modified polyisocyanates), in particular those modified polyisocyanates that are derived from 2,4- and/or 2,6-tolylene diisocyanate and from 4,4'- and/or 2,4'-diphenylnethane diisocyanate.

The organic polyisocyanate component for producing rigid PUR/PIR foams preferably comprises mixtures of isomers of diphenylmethane diisocyanate (MDI) and its oligomers. Mixtures of this type are generally referred to as "polymeric MDI" (pMDI).

The polyol component comprises at least one polyester polyol of the present invention and may in addition also comprise further polyol components. By way of such further polyol components there may be used at least one aliphatic polyester polyol which in addition to structural units derived from adipic acid also contains structural units derived from glutaric acid, succinic acid and/or sebacic acid, preferably glutaric acid and/or succinic acid. It is further preferable for the aliphatic polyester polyol to contain no aromatic units. A particularly preferred aliphatic polyester polyol is obtainable by reacting a mixture containing 15 to 45 wt % of adipic acid, 40 to 55 wt % of glutaric acid and 10 to 35 wt % of succinic acid. The succinic acid and the glutaric acid may here be in the form of the anhydride in part.

The alcohol component used for preparing the further aliphatic polyester polyols comprises glycols such as ethylene glycol, diethylene glycol, triethylene glycol, tetraethylene glycol, 1,2-propanediol, 1,3-propanediol, 1,4-butanediol, 3-methyl-1,5-pentanediol, 1,5-pentanediol, 1,6-hexanediol, 1,10-decanediol, glycerol, trimethylolpropane and/or mixtures thereof. It is preferable to use monoethylene glycol and diethylene glycol, more preferably monoethylene glycol. The further aliphatic polyester polyols preferably have a functionality of 1.8 to 6.5, in particular 1.8 to 3.0, an OH number of 15 to 500 mg KOH/g, in particular 150 to 300, and also an acid number of 0.5 to 5.0 mg KOH/g.

The further aliphatic polyester polyols aside, the polyol component may further comprise compounds having isocyanate-reactive hydrogen atoms other than polyester polyols, for example short-chain polyether polyoles or low molecular weight extenders or crosslinkers. These additions work to improve the flowability of the reaction mixture and the emulsifiability of the expandable formulation.

Polyol component B) may be admixed with flame retardants, preferably in an amount of 5 to 50 wt %, based on the overall amount of compounds having isocyanate-reactive hydrogen atoms in the polyol component, in particular 7 to 35 wt %, more preferably 12 to 25 wt %. Flame retardants of this type are known in principle to a person skilled in the art and are described for example in "Kunststofthandbuch", volume 7 "Polyurethane", chapter 6.1. These may be, for example, brominated and chlorinated polyols or phosphorus compounds such as the esters of orthophosphoric acid and of metaphosphoric acid, which may likewise contain halogen. Room temperature liquid flame retardants are chosen for preference.

Sufficient blowing agent and co-blowing agent is used as is required for achieving a dimensionally stable foam matrix and the desired apparent density. The proportion may be, for example, from 0 to 6.0 wt % of co-blowing agent and from 1.0 to 30.0 wt % of blowing agent, all based on 100 wt % of polyol component. The mixing ratio of co-blowing agent to blowing agent may be in the range from 20:1 to 0:100, as desired.

The blowing agents used are hydrocarbons, for example the isomers of pentane, or hydrofluorocarbons, e.g., HFC 245fa (1,1,1,3,3-pentafluoropropane), HFC 365mfc (1,1,1, 3,3-pentafluorobutane) or their mixtures with HFC 227ea (heptafluoropropane). Various classes of blowing agent are also combinable. For instance, mixtures of n- or c-pentane with HFC 245fa in a ratio of 75:25 (n-/c-pentane:HFC 245fa) give thermal conductivities measured at 10° C. of less than 20 mW/mK.

Water is used as co-blowing agent, preferably in an amount of up to 6 wt %, more preferably 0.5 to 4 wt %, based on the overall amount of compounds having isocyanate-reactive hydrogen atoms in the polyol component.

The polyol component is advantageously admixed with catalysts customary in polyurethane chemistry. The amine catalysts needed for producing a rigid PUR/PIR foam and also the salts used as trimerization catalysts are used in such an amount that, for example, continuous manufacturing lines will produce elements having flexible outer layers at speeds up to 60 m/min, depending on element thickness, as well as making it possible to produce insulation on pipes, walls, roofs and also tanks and in refrigerators in the spray foam process with sufficient cure time. Batch production is also possible.

Examples of such catalysts are triethylenediamine, N,N-dimethylcyclohexylamine, tetramethylenediamine, 1-methyl-4-dimethylaminoethylpiperazine, triethylamine, tributylamine, dimethylbenzylamine, N,N',N"-tris-(dimethylaminopropyl)hexahydrotriazine, dimethylaminopropylfOrmamide, N,N,N',N"-tetramethylethylenediamine, N,N,N',N"-tetramethylbutanediamine, tetramethylhexanediamine, pentamethyldiethylenetriamine, tetramethyldiaminoethyl ether, dimethylpiperazine, 1,2-dimethylimidazole, 1-azabicyclo[3.3.0]octane, bis(dimethylaminopropyl)-urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine, dimethylethanolamine, tin(II) acetate, tin(II) octoate, tin(II) ethylhexoate, tin(II) laurate, dibutyltin diacetate, dibutyltin dilaurate, dibutyltin maleate, dioctyltin diacetate, tris(N,N-dimethyl-aminopropyl)-s-hexahydrotriazine, tetramethylammonium hydroxide, sodium acetate, sodium octoate, potassium acetate, potassium octoate, sodium hydroxide or mixtures thereof.

Foam stabilizers may further be added to the polyol component, especially polyether siloxanes. These compounds generally have a construction where a polydimethylsiloxane moiety is attached to a copolymer of ethylene oxide and propylene oxide. Substances of this type are commercially available, for example as Struksilon 8031 from Schill & Seilacher. It is also possible to use silicone-free stabilizers, for example the LK 443 product from Air Products.

In one preferred embodiment of the reaction system according to the present invention, the weight ratio between components B) and A) is from 100:150 to 100:300, in particular from 100:180 to 100:250.

The invention further provides a method of manufacturing rigid PUR/PIR foams, which comprises said components A) and B) and also optionally C) of a reaction system of the present invention being mutually mixed and reacted.

The rigid PUR/PIR foams of the present invention are typically produced by the one-step method known to a person skilled in the art, wherein the reaction components are reacted with each other in a continuous or batchwise manner and then subsequently cured either manually or with mechanical assistance in the high- or low-pressure process following exportation onto a conveyor belt or in suitable molds. Examples are described in U.S. Pat. No. 2,764,565, in G. Oertel (ed.) "Kunststoff-Handbuch", volume VII, Carl Hanser Verlag, $3^{rd}$ edition, Munich 1993, pp. 267 ff., and also in K. Uhlig (ed.) "Polyurethan Taschenbuch", Carl Hanser Verlag, $2^{nd}$ edition, Vienna 2001, pp. 83-102.

The invention additionally provides a rigid foam obtainable by mixing and reacting said components A) and B) and also optionally C) of a reaction system of the present invention.

A rigid foam of this type can be used in various fields of application, especially as an insulating material. Examples from the field of civil engineering are wall insulation, pipe shells and/or half-shells, roof insulation, wall elements and flooring panels. In particular, the rigid foam may be in the form of an insulating panel or of a composite element having flexible or non-flexible outer layers and have a density of 25 to 65 kg/m$^3$, in particular 30 to 45 kg/m$^3$. In another embodiment, the rigid foam may be in the form of a slabstock foam and have a density of 25 to 300 kg/m$^3$, in particular 30 to 80 kg/m$^3$.

The invention also provides laminates containing the rigid PUR/PIR foams of the present invention. These laminates have a core comprising rigid PUR/PIR foam of the present invention and outer layers firmly bonded thereto. The outer layers may be flexible or rigid. Examples are paper type outer layers, nonwoven type outer layers, metal type outer layers (e.g., steel, aluminum) and composite type outer layers. The production of laminates of this type is known in principle to a person skilled in the art and described for example in G. Oertel (ed.) "Kunststoff-Handbuch", volume VII, Carl Hanser Verlag, $3^{rd}$ edition, Munich 1993, pp. 272-277. It preferably takes the form of the double conveyor belt process, wherein the laminates of the present invention are easily obtainable at belt speeds up to 60 m/min.

A special advantage of the rigid PUR/PIR foams according to the present invention is their improved fire behavior as compared with systems based on polyester polyols wherein a long-chain polyether polyol was merely admixed to the polyol formulation. The examples which follow provide experimental verification of this.

Employed Raw Materials and Methods:

| | |
|---|---|
| (PET) L 2830: | Desmophen ® L 2830, Bayer MaterialScience AG. Aliphatic polyether polyol having an OH number of 28, a molar mass of 4000 Da, about 90 mol % of primary OH end groups and a viscosity 860 mPas at 25° C. |
| TCPP | trischloroisopropyl phosphate (Levagard PP ®, Lanxess AG), |
| DMCHA | dimethylcyclohexylamine (Rheinchemie), |
| 8033 | Struksilon 8033 from Schill & Seilacher |
| 1792 | Desmorapid ® 1792, Bayer MaterialScience AG. Preparation containing diethylene glycol and potassium acetate. Trimerization catalyst. |
| 44V40L | Desmodur 44V40 L from Bayer MaterialScience AG with an NCO content of 30 to 32 wt % |
| Glutaric acid, technical grademixture of succinic, glutaric and adipic acids (Lanxess) | |
| Phthalic anhydride | (My-ChemGmbH) |
| Isophthalic acid | (Aldrich) |
| Ethylene glycol | (Ineos) |
| n-Pentane | (Kraemer&Martin GmbH) |
| Tin(II) chloride dihydrate | (Aldrich) |

Analyses were carried out as follows:

Dynamic viscosity: Rheometer MCR 51 from Anton Paar to DIN 53019 with a CP 50-1 cone, diameter 50 mm, angle 1° at shear rates of 25, 100, 200 and 500 s$^{-1}$. The polyester polyols in accordance with the present invention and not in accordance with the present invention exhibit shear rate independent viscosity values.

Hydroxyl number: in accordance with the DIN 53240 standard (December 1971)

Acid number: in accordance with the DIN EN ISO 2114 standard (June 2002)

Apparent density was determined as per DIN EN ISO 3386-1-98.

Fire properties were determined as per DIN 4102.

Examples

Preparation of Polyester Polyols for Comparative
Examples as Per Example A-1C

A 4 liter four-neck flask fitted with mechanical stirrer, 50 cm Vigreux column, thermometer, nitrogen inlet and also column head, distillation bridge and vacuum membrane pump was initially charged with 1820 g (13.59 mol) of technical grade glutaric acid and 1168 g (18.82 mol) of ethylene glycol and this initial charge was heated to 200° C. under a nitrogen blanket in the course of 60 min, during which water of reaction was distilled off. After 4 hours, 50 mg of tin dichloride dihydrate (corresponds to 20 ppm based on end product) were admixed and the reaction was continued by gradually reducing the pressure to 160 mbar in the course of 2 hours. The reaction was allowed to continue under these conditions overnight and after an overall reaction time of 20 hours the OH number and the acid number were found to be 197 mg KOH/g and 2.4 mg KOH/g, respectively. Exported ethylene glycol was replenished, being stirred in at 160° C. under atmospheric pressure for a further 6 hours.

Analysis of polyester A-1C:
hydroxyl number: 215.8 mg KOH/g
acid number: 1.3 mg KOH/g
viscosity: 1510 mPas (25° C.)
    280 mPas (50 C)
    95 mPas (75° C.)

Preparation of Inventive Polyester Polyols as Per
Example A-5

A 4 liter four-neck flask fitted with mechanical stirrer, 50 cm Vigreux column, thermometer, nitrogen inlet and also column head, distillation bridge and vacuum membrane pump was initially charged with 1674 g (12.5 mol) of technical grade glutaric acid, 192 g (0.048 mol) of PET L2830 and 1084 g (17.46 mol) of ethylene glycol and this initial charge was heated to 200° C. under a nitrogen blanket in the course of 60 min, during which water of reaction was distilled off. After 4 hours, 50 mg of tin dichloride dihydrate (corresponds to 20 ppm based on end product) were admixed and the reaction was continued by gradually reducing the pressure to 170 mbar in the course of 2 hours. The reaction was allowed to continue under these conditions overnight and after an overall reaction time of 22 hours the OH number and the acid number were found to be 195.3 mg KOH/g and 0.8 mg KOH/g, respectively.

Analysis of polyester A-5:
hydroxyl number: 195.3 mg KOH/g
acid number: 0.8 mg KOH/g
viscosity: 2210 mPas (25° C.)
    415 mPas (50 C)
    145 mPas (75° C.)

Determination of Phase Stability:

A 73 g quantity of the above-described polyester polyol A-1C was admixed with 12 parts of PET L2830 at 80° C. by stirring and stored at room temperature for 24 hours. Two phases developed, the smaller, upper one containing the admixed PET L2830. This mixture was accordingly not phase stable.

A 73 g quantity of the above-described polyester polyol A-1C was admixed with 6 parts of PET L2830 at 80° C. by stirring and stored at room temperature for 24 hours. Two phases developed, the smaller, upper one containing the admixed PET L2830. This mixture was thus likewise not phase stable.

Inventive polyester polyol A-5 is a phase-stable polyester polyol because the PET L2830 is integrated in the polymer chain.

TABLE 1

| Preparation of non-inventive polyester polyols (comparison) | | | | | |
|---|---|---|---|---|---|
| Polyester polyol | | A-1C | A-2C | A-3C | A-4C |
| Recipe: | | | | | |
| Glutaric acid, technical grade | [g] | 1820 | 1607 | 1401 | 1606 |
| Phthalic anhydride | [g] | | 197 | 387 | |
| Isophthalic acid | [g] | | | | 221 |
| Ethylene glycol | [g] | 1168 | 1152 | 1136 | 1152 |
| Water of reaction | [g] | −489 | −455 | −423 | −479 |
| Ester quantity | [g] | 2500 | 2500 | 2500 | 2500 |
| Computed variables: | | | | | |
| Aromatic fraction in ester | [wt %] | 0 | 7.9 | 15.5 | 8.8 |
| L2830 fraction in ester | [wt %] | 0 | 0 | 0 | 0 |
| Experimental values: | | | | | |
| OH number, exp. | [mg KOH/g] | 215.8 | 229.5 | 239.4 | 228.9 |
| Acid number, exp. | [mg KOH/g] | 1.3 | 2 | 2.8 | 3.5 |
| Viscosity, 25° C. | [mPas] | 1510 | 2000 | 2840 | 2220 |
| Determination of phase stability; 73 parts of polyester and | | | | | |
| admixture of 6 parts of L2830 | | no | no | yes | n.d. |
| admixture of 12 parts of L2830 | | no | no | yes | n.d. |

Explanations regarding table 1:
The aromatic fraction in the ester is computed from the ester recipe by dividing the amount of phthalic anhydride or isophthalic acid used by the ester quantity obtained. For example, the aromatics fraction in Example A-3C is computed by dividing the 387 g of phthalic anhydride used by the 2500 g of ester obtained, multiplied by 100, etc.

The determination of phase stability in the mixing ratios of 73 parts of polyester to 6 or 12 parts of PET L2830 shows that at low fractions of aromatic, in the polyester (0 wt % in the case of A-1C and 7.9 wt % in the case of A-2C) there is, disadvantageously, no miscibility. In the case of A3-C, there is miscibility, evidently as a consequence of the further increased aromatic fraction (15.5 wt %). As will be shown in table 3, however, such a formulation does not achieve the required fire protection class B2 (see B-6C in table 3).

mixed with polyisocyanate (a mixture of MDI isomers and their higher homologs with an NCO content of 31 wt %, Desmodur® 44V40L, Bayer MaterialScience AG) and the mixture was poured into a paper mold (30×30×10 cm$^3$) and fully reacted therein. The recipes and results of physical measurements on the specimens obtained are reported in table 3.

Adherence between foam and outer layer was investigated on paper type outer layers, manually, at certain time intervals

TABLE 2

Preparation of inventive polyester polyols

| Polyester polyol | | A-5 | A-6 | A-7 | A-8 | A-9 | A-10 |
|---|---|---|---|---|---|---|---|
| Recipe: | | | | | | | |
| Glutaric acid, technical grade | [g] | 1674 | 1544 | 1478 | 1289 | 1288 | 1107 |
| Phthalic anhydride | [g] | | | 181.3 | 356 | | 523.7 |
| Isophthalic acid | [g] | | | | | 399 | |
| Ethylene glycol | [g] | 1084 | 1007 | 1069 | 1054 | 1054 | 1040 |
| L2830 | [g] | 192 | 364 | 191 | 191 | 191 | 190 |
| Water of reaction | [g] | −449 | −414 | −419 | −389 | −432 | −361 |
| Ester quantity | [g] | 2500 | 2500 | 2500 | 2500 | 2500 | 2500 |
| Computed variables: | | | | | | | |
| Aromatic fraction in ester | [wt %] | 0 | 0 | 7.3 | 14.2 | 16 | 20.9 |
| L2830 fraction in ester | [wt %] | 7.7 | 14.6 | 7.6 | 7.6 | 7.6 | 7.6 |
| Experimental values: | | | | | | | |
| OH number, exp. | [mg KOH/g] | 195.3 | 187.7 | 205 | 197.8 | 198.5 | 201 |
| Acid number, exp. | [mg KOH/g] | 0.8 | 1.4 | 1.7 | 0.5 | 0.5 | 1.64 |
| Viscosity, 25° C. | [mPas] | 2210 | 2760 | 2780 | 4660 | 5280 | 5950 |
| Determination of phase stability: | | yes | yes | yes | yes | yes | yes |

Explanations regarding table 2:
The aromatic fraction in the ester is computed from the ester recipe as described in table 1. The fraction of L2830 in the ester is determined in a similar manner.

Since the inventive polyester polyols of table 2 already contain the long-chain L2830 as an integral constituent, phase stability was determined without further admixture of polyether. Examples A-5 and A-6 for instance evince monophasicness even though overall virtually the same composition is present as in Comparative Example A-1C, see table 1. Examples A-7 to A-10 do not show any visible improvement with regard to monophasicness, since these cases were already phase stable as mere mixtures, even without interesterification. However, the fire tests shown hereinbelow demonstrate that Inventive Polyester Polyols A-5 to A-10 are superior to the mere mixtures A-1C to A-4C in terms of fire behavior.

Production of Rigid PUR/PIR Foams:

The polyol components identified above were used to produce rigid PUR/PIR foams. To this end, the particular polyol component was admixed with flame retardant, a foam stabilizer based on polyether siloxane, catalysts, water and n-pentane as blowing agent, the mixture thus obtained was and on fresh rigid isocyanurate-containing PUR/PIR foam obtained according to the present invention. The results were assigned qualitative grades where "good" is to be understood as meaning that the paper can only be laboriously picked off, "fair" is to be understood as meaning that the paper can be peeled off with minimal effort, "satisfactory" is to be understood as meaning that the paper is easy to peel off, "unsatisfactory" is to be understood as meaning that the paper only adheres to the foam in parts, and "not even unsatisfactory" is to be understood as meaning that the paper has no adherence to the foam. Brittleness was determined qualitatively by using the thumb to press down on the foam in the core and edge regions. Apparent density was determined on a 10×10×10 cm$^3$ cube by determining the weight. Lambda values were determined by means of the DIN 52616 heat flux method at 10° C. midpoint temperature (Fox instrument). Fire properties were determined in accordance with DIN 4102.

TABLE 3

Production and properties of inventive and noninventive (comparative) rigid PUR/PIR foams comprising phthalic anhydride

| | | B-1C | B-2 | B-3 | B-4C | B-5 | B-6C | B-7 | B-8 |
|---|---|---|---|---|---|---|---|---|---|
| Recipe of polyol | | | | | | | | | |
| A-1C | [g] | 73 | | | | | | | |
| A-2C | [g] | | | | 73 | | | | |
| A-3C | [g] | | | | | | 73 | | |

TABLE 3-continued

Production and properties of inventive and noninventive (comparative) rigid PUR/PIR foams comprising phthalic anhydride

|  |  | B-1C | B-2 | B-3 | B-4C | B-5 | B-6C | B-7 | B-8 |
|---|---|---|---|---|---|---|---|---|---|
| A-5 | [g] |  | 79 |  |  |  |  |  |  |
| A-6 | [g] |  |  | 85 |  |  |  |  |  |
| A-7 | [g] |  |  |  | 79 |  |  |  |  |
| A-8 | [g] |  |  |  |  | 79 |  |  |  |
| A-10 | [g] |  |  |  |  |  |  | 79 | 79 |
| L2830 | [g] | 6 | — | — | 6 | — | 6 | 6 | 6 |
| TCPP | [g] | 15 | 15 | 15 | 15 | 15 | 15 | 15 | 15 |
| 8033 | [g] | 2 | 2 | 2 | 2 | 2 | 2 | 2 | 2 |
| Water | [g] | 1 | 1 | 1 | 1 | 1 | 1 | 1 | 1 |
| 1792 | [g] | 3 | 3 | 3 | 3 | 3 | 3 | 3 | 3 |
| DMCHA | [g] | 0.8 | 0.8 | 0.8 | 0.8 | 0.8 | 0.8 | 0.8 | 0.8 |
| n-Pentane | [g] | 17 | 17 | 17 | 17 | 17 | 17 | 17 | 17 |
| Computed variables: |  |  |  |  |  |  |  |  |  |
| Polyol side overall | [g] | 117.8 | 117.8 | 123.8 | 117.8 | 117.8 | 117.8 | 117.8 | 117.8 |
| Fraction of aromatic in polyol side | [wt %] | — | — | — | 4.9 | 4.9 | 9.7 | 9.5 | 14.0 |
| Fraction of L2830 from ester | [wt %] | — | 5.2 | 10.0 | — | 5.1 | — | 5.1 | 5.1 |
| Fraction of L2830 admixed | [wt %] | 5.1 | — | — | 5.1 | — | 5.1 | 5.1 | 5.1 |
| NCO side: |  |  |  |  |  |  |  |  |  |
| 44V40L | [g] | 200 | 200 | 200 | 200 | 200 | 200 | 200 | 200 |
| Index | [ ] | 335 | 342 | 334 | 322 | 331 | 314 | 337 | 335 |
| Properties: |  |  |  |  |  |  |  |  |  |
| Individual flame | [mm] | 150(3) | 130 | 130 | 150(2) | 130 | 160(2) | 140 | 140 |
| Individual flame | [mm] | 150(2) | 130 | 130 | 140 | 140 | 150(2) | 140 | 130 |
| Individual flame | [mm] | 150(2) | 140 | 130 | 150(3) | 140 | 150(2) | 140 | 120 |
| Individual flame | [mm] | 140 | 130 | 120 | 150(3) | 140 | 150(2) | 130 | 130 |
| Mean flame height | [mm] | 148 | 133 | 128 | 148 | 138 | 153 | 138 | 130 |
| Fire |  | B3 | B2 | B2 | B3 | B2 | B3 | B2 | B2 |

Explanations regarding table 3:
The fraction of aromatic on the polyol side is computed from the aromatic fraction in the ester, as explained above regarding tables 1 and 2, and also the fraction of polyester on the polyol side of the foam recipe. For example, 117.8 parts of Inventive Foam B-8 contain 79 parts of Ester A-10. Therefore, the polyol side of B-8 contains 79/117.8*20.9 = 14.0 wt % of aromatic. The fractions of L2830 were determined in a similar manner except that, to illuminate the invention, a distinction is made as to whether L2830 has been built into the ester or/and is admixed in free form to the foam recipe. Both is the case in Foam B-8 for example.

The fire class was determined by 4 individual measurements of the flame height in each case. When an individual value below 150 mm was obtained, this value is noted in table 3 without addendum. In the case of individual values equal to or higher than 150 mm, the time in seconds after which the stated flame height was reached is noted between parentheses. To achieve fire class B2, all 4 individual values have to be below 150 mm.

In addition to the properties reported in table 3, core apparent density was determined for all samples (this also applies to the tables hereinbelow) and found to be between 29.6 and 33 kg/m$^3$.

Recipe reactivity, measured as fiber time, was very similar for all recipes, ranging from 31 to 40 seconds.

All the foams obtained were closed cell, finely cellular, dimensionally stable, with good adherence to the paper type outer layer.

B-1C represents a case where the polyester does not contain any aromatic fraction and L2830 is present on the polyol side in a fraction of 5.1 wt %. This foam merely achieves fire class B3. When, however, virtually the same amount of L2830 (test B-2) or an increased amount (test B-3) is already built into the ester, an otherwise unchanged recipe will achieve a significantly reduced flame height and in both cases a B2 fire class.

The result is also similar in the case of recipes each containing 4.9 wt % of aromatic on the polyol side: B-4C, where the L2830 was merely admixed, is distinctly worse in terms of flame height and fire class than the inventive B-5, which achieves fire class B2 even under these conditions.

B-6C shows that this effect arises even at higher aromatic fractions (9.7 wt %). Only the incorporation of L2830 in the polyester component causes a distinct decrease in flame height, although in B-7 the same amount of L2830 was additionally admixed on the polyol side also.

TABLE 4

Production and properties of noninventive (comparative) rigid PUR-PIR foams comprising phthalic anhydride

|  |  | B-9C | B-10C |
|---|---|---|---|
| Recipe on polyol side: |  |  |  |
| A-2C | [g] | 73 |  |
| A-3C | [g] |  | 73 |
| L2830 | [g] | 12 | 12 |
| TCPP | [g] | 15 | 15 |
| 8033 | [g] | 2 | 2 |
| Water | [g] | 1 | 1 |
| 1792 | [g] | 3 | 3 |
| DMCHA | [g] | 0.8 | 0.8 |
| n-Pentane | [g] | 17 | 17 |
| Computed variables: |  |  |  |
| Polyol side overall | [g] | 117.8 | 117.8 |
| Fraction of aromatic on polyol side | [wt %] | 4.9 | 9.6 |

TABLE 4-continued

Production and properties of noninventive (comparative) rigid PUR-PIR foams comprising phthalic anhydride

| | | B-9C | B-10C |
|---|---|---|---|
| Fraction of L2830 from ester | [wt %] | — | — |
| Fraction of L2830 admixed | [wt %] | 10.2 | 10.2 |
| NCO side: | | | |
| 44V40L | [g] | 200 | 200 |
| Index | [ ] | 319 | 312 |
| Properties: | | | |
| Individual flame height | [mm] | 150(2s), 140, 150(2s), 150(2s) | 160(2s), 150(2s), 140, 150(2s) |
| Mean flame height | [mm] | 148 | 150 |
| Fire | | B3 | B3 |

Table 4 illustrates that an increased amount of L2830 not built in does not lead to attainment of fire class B2 for aromatic fractions of 4.9 wt % and 9.6 wt %. This becomes evident on comparing B-9C with B-5 and B-6C and/or B-10C with B-7.

TABLE 5

Production and properties of inventive and non inventive (comparative) rigid PUR/PIR foams comprising isophthalic acid.

| Polyester polyol | | B-11C | B-12 | B-13C |
|---|---|---|---|---|
| A4-C | [g] | 73 | | 73 |
| A-9 | [g] | | 79 | |
| L2830 | [g] | 6 | — | 12 |
| TCPP | [g] | 15 | 15 | 15 |
| 8033 | [g] | 2 | 2 | 2 |
| Water | [g] | 1 | 1 | 1 |
| 1792 | [g] | 3 | 3 | 3 |
| DMCHA | [g] | 0.8 | 0.8 | 0.8 |
| n-Pentane | [g] | 17 | 17 | 17 |
| Computed variables: | | | | |
| Polyol side overall | [g] | 117.8 | 117.8 | 117.8 |
| Fraction of aromatic on polyol side | [wt %] | 5.5 | 10.7 | 5.5 |
| Fraction of L2830 from ester | [wt %] | — | 5.1 | — |
| Fraction of L2830 admixed | [wt %] | 5.1 | — | 10.2 |
| NCO side: | | | | |
| 44V40L | [g] | 200 | 200 | 200 |
| Index | [ ] | 322 | 338 | 320 |
| Properties: | | | | |
| Individual flame height | [mm] | 140, 140, 140, 150(2s) | 140, 140, 130, 130 | 150(3s), 150(3s), 150(3s), 140 |
| Mean flame height | [mm] | 143 | 135 | 143 |
| Fire | | B3 | B2 | B3 |

Table 5 shows that the admixture of L2830 in proportions of 5.1 and 10.2 wt % to polyol sides comprising 5.5 wt % of aromatic is not sufficient to attain fire class B2 (B-11C and B-13C).

Yet fire class B2 is attained on building in 5.1 wt % of L2830.

The invention claimed is:

1. A polyester polyol comprising structural units derived from ethylene glycol and/or diethylene glycol and structural units derived from at least one long-chain polyether polyol having a number average molar mass of 1500 to 8000 Da,
    wherein the polyester polyol has a hydroxyl number of 165 to 260 mg, KOH/g, and
wherein:
    (a) a proportion of polyester polyol, structural units derived from the long-chain polyether polyol is from 2 to 30 wt %, based on the mass of the polyester polyol;
    (b) a proportion of polyester polyol structural units derived from ethylene glycol and/or diethylene glycol is from 35 to 58 wt %, based on the mass of the polyester polyol; and
    (c) a proportion of polyester polyol structural units derived from an at least difunctional organic acid is from 40 to 75 wt %, based on the mass of the polyester polyol.

2. The polyester polyol of claim 1, wherein the polyester polyol has an OH functionality of 1.8 to 3.

3. The polyester polyol of claim 1, wherein the polyester polyol has from 50 to 100 mol % of primary hydroxyl end groups.

4. The polyester polyol of claim 1, wherein the long-chain polyether polyol has a number average molar mass of 1500 to 7000 Da.

5. The polyester polyol of claim 1, wherein the at least difunctional organic acid comprises glutaric acid, succinic acid, adipic acid, terephthalic acid, phthalic acid, isophthalic acid or a combination thereof.

6. The polyester polyol of claim 5, wherein an aromatic fraction of the polyester polyol is from 0 to 50 wt %, and where a mixture of glutaric acid, succinic acid, adipic acid and/or phthalic acid is used.

7. The polyester polyol of claim 1, wherein
    (a) the proportion of polyester polyol structural units derived from the long-chain polyether polyol is from 3 to 20 wt %, based on the mass of the polyester polyol;
    (b) the proportion of polyester polyol structural units derived from ethylene glycol and/or diethylene glycol is from 40 to 58 wt %, based on the mass of the polyester polyol; and (c) the proportion of polyester polyol structural units derived from the at least difunctional organic acid is from 50 to 70 wt %, based on the mass of the polyester polyol.

8. The polyester polyol of claim 1, wherein the long-chain polyether polyol has a number average molar mass of 3500 to 8000 Da.

9. The polyester polyol of claim 1, wherein the long-chain polyether polyol has a number average molar mass of 4000 to 8000 Da.

10. The polyester polyol of claim 1, wherein the long-chain polyether polyol has a number average molar mass of 3500 to 6000 Da.

11. The polyester polyol of claim 1, herein the long-chain polyether polyol has a number average molar mass of 4000 to 6000 Da.

12. A method of preparing the polyester polyol of claim 1, comprising reacting the at least difunctional organic acid with the ethylene glycol and/or diethylene glycol and the at least one long-chain polyether polyol having a number average molar mass of 1500 to 8000 Da, optionally in the presence of at least one catalyst.

13. A method of using the polyester polyol of claim 1 comprising including the polyester polyol in a 1-phase polyol component of a two-component reaction system for producing rigid PUR/PIR foams, wherein the 1-phase polyol component is free from flame retardants.

14. A reaction system for producing rigid PUR/PIR foams, comprising:
A) an organic polyisocyanate component,
B) a polyol component,
C) optionally auxiliary and added-substance materials and also blowing and co-blowing agent,
wherein said organic polyisocyanate component A) and said polyol component B) are used in such a mixing ratio relative to each other as to produce an index of 100 to 500 wherein
said polyol component B) comprises the polyester polyol of claim 1.

15. The reaction system of claim 14, wherein the weight ratio between components B) and A) is from 100:150 to 100:300.

16. A method of manufacturing a rigid PUR/PIR foam, which comprises mixing and reacting said components A) and B) and also optionally C) of the reaction system of claim 14.

17. A rigid foam obtained by mixing and reacting said components A) and B) and also optionally C) of the reaction system of claim 14.

18. The rigid foam of claim 17, wherein the rigid foam is in the form of an insulating panel or of a composite element having flexible or non-flexible outer layers and has a density of 25 to 65 kg/m$^3$, or is in the form of a slabstock foam and has a density of 25 to 300 kg/m$^3$.

* * * * *